Feb. 9, 1965
F. W. LAIDLER
3,168,762
FOLDABLE MOBILE BUILDING
Filed Nov. 13, 1961
4 Sheets-Sheet 1
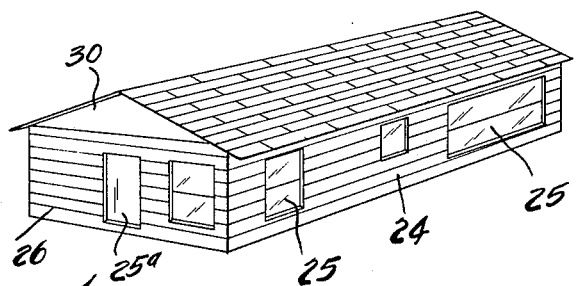
Fig. 1
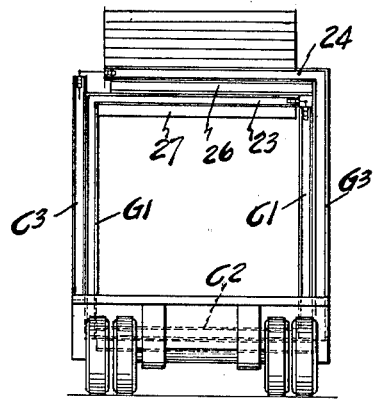
Fig. 13
Fig. 2
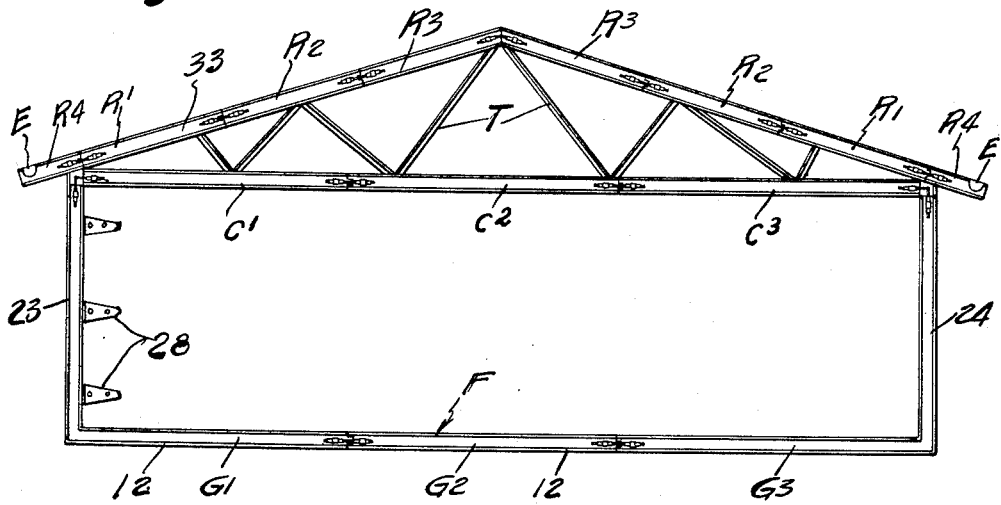
Fig. 3
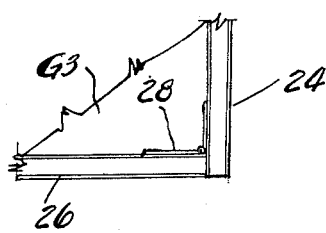
Fig. 12
INVENTOR.
Forrest W. Laidler
BY
Kearman Kearman & McCulloch
ATTORNEYS Feb. 9, 1965  F. W. LAIDLER  3,168,762
FOLDABLE MOBILE BUILDING
Filed Nov. 13, 1961  4 Sheets-Sheet 2
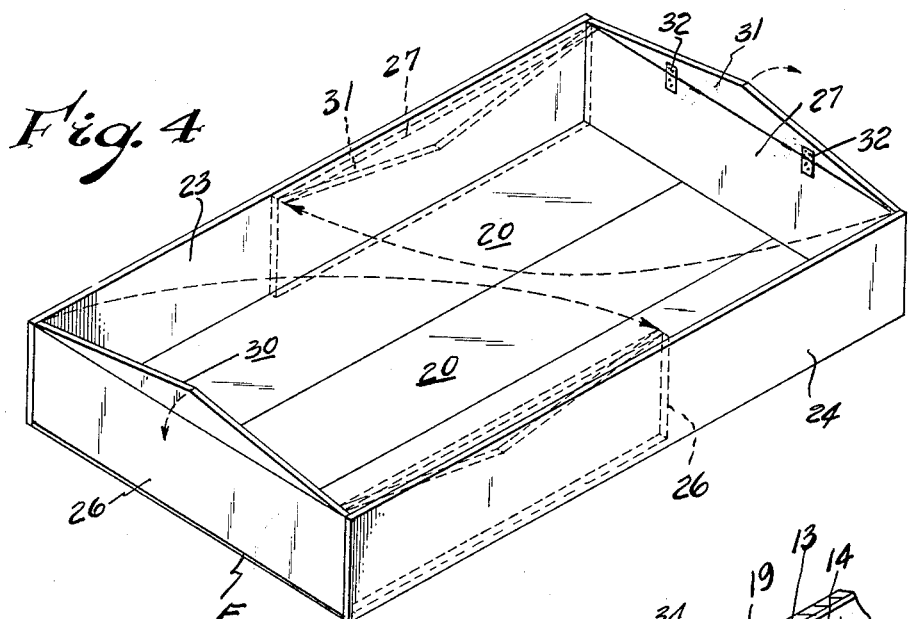
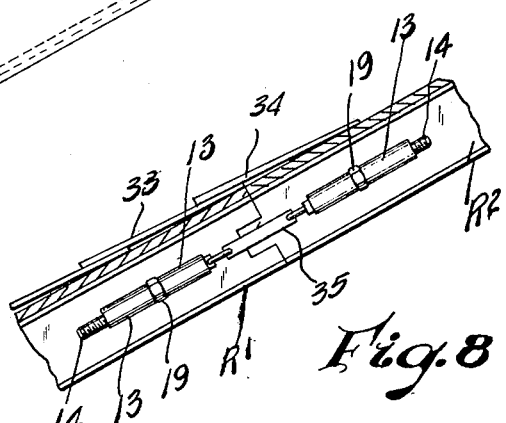
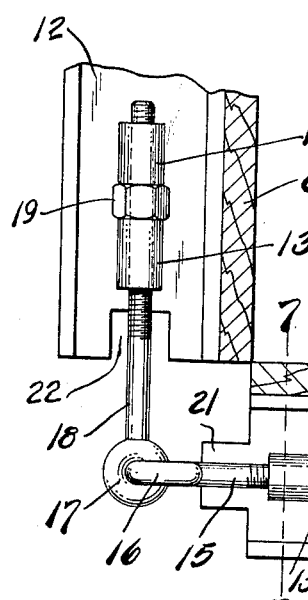
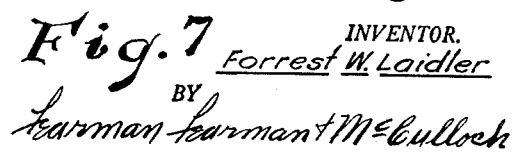
INVENTOR.
Forrest W. Laidler
BY
Fearman Fearman + McCulloch
ATTORNEYS

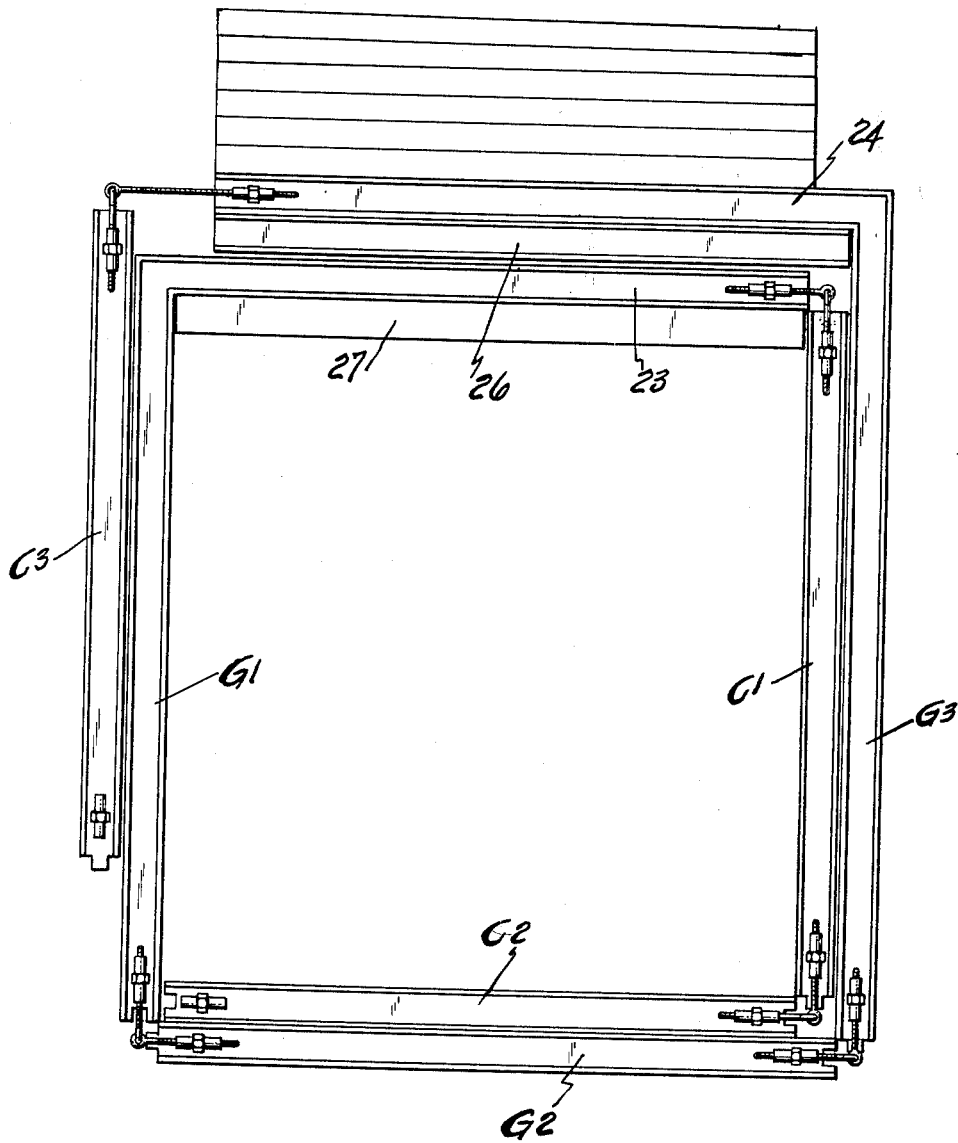

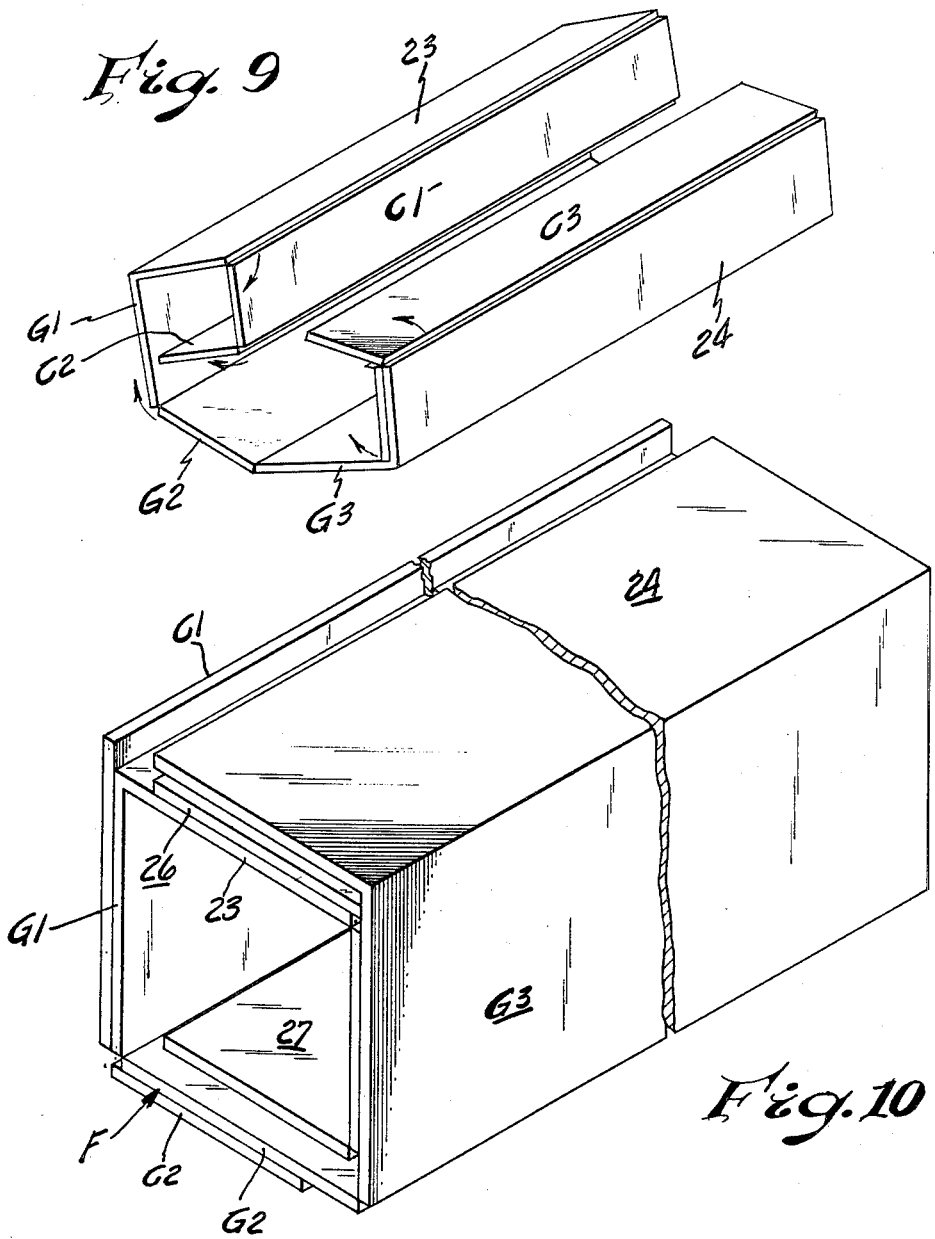

United States Patent Office 3,168,762
Patented Feb. 9, 1965

3,168,762
FOLDABLE MOBILE BUILDING
Forrest W. Laidler, Imlay City, Mich.
(58400 Romeo Plank, Washington, Mich.)
Filed Nov. 13, 1961, Ser. No. 151,647
7 Claims. (Cl. 20—2)

This invention relates to mobile homes and more particularly to foldable mobile homes whereby the floor, walls and roof of the home are foldable into a compact bundle to the end that the home can be readily transported by low boy trailer or other carrier over the highways and erected on a suitable lot ready for occupancy in a minimum length of time, or again moved, when desired, from one location to another at a minimum of expense and labor.

One of the prime objects of the invention is to design a simple, practical and inexpensive mobile home in which the floor, walls and other components are readily foldable with respect to each other and which are so designed as to form a rigid, tight, weatherproof structure when completed.

A further object of the invention is to design a mobile home structure which can be completely fabricated in the factory and which can be set up and erected on the site with unskilled labor, and in a minimum length of time.

In the interest of economy in building, labor and material, it is essential that the homes be constructed in a factory and mass produced to minimize labor and utilize the building materials to the fullest extent, and in mobile homes in general which must be transported over the Nation's highways, it is essential that the components be foldable, as the width and height of any article traversing or transported over the Nation's highways is governed by law, and in many instances, it can be moved only after securing permit to travel at certain specified hours and over certain designated highways; and I have, therefore, designed a home, the hinged or detachable connected sections of which are compactly foldable, together with the roof and similar parts of which are readily packed with the main folded sections.

Still a further object is to provide a sturdy, easily operable, hinged, interconnecting members for connecting the various components, hold them in assembled relation, said members being readily adjustable to permit the components to be released and swung to folded positions.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit or sacrificing any of the advantages of the invention.

In the drawings:

FIG. 1 is a perspective view of my foldable, sectional home assembled and erected.

FIG. 2 is an enlarged, end elevational view showing the sections folded and loaded on a conventional low boy automotive truck for transportation to a building site.

FIG. 3 is a transverse, sectional view through the home with the parts in erected assembled position.

FIG. 4 is a perspective plan view of the assembled structure with the roof and trusses omitted, the broken lines illustrating the folding of the side and end walls, the arrows indicating the direction of swing to fold.

FIG. 5 is a plan view showing the components in folded position.

FIG. 6 is an enlarged detail showing the means for connecting the floor sections.

FIG. 7 is a fragmentary, transverse, sectional view taken on line 7—7 of FIG. 6.

FIG. 8 is a view similar to FIG. 6 showing a similar method of connecting the roof sections.

FIG. 9 is a fragmentary, perspective view illustrating the hinging of the floor and wall sections.

FIG. 10 is a perspective view illustrating the folding of the various components, etc., to fully folded position.

FIG. 11 is a detail illustrating the manner of mounting the eave trough.

FIG. 12 is a fragmentary, top plan view illustrating the hinging of the end walls to the side walls.

FIG. 13 is an enlarged fragmentary, sectional plan view showing the locking of the end wall to the side wall, the broken lines illustrating the swinging movement.

Referring now more specifically to the drawings in which I have shown the preferred embodiment of my invention, the letter F indicates broadly the floor of the mobile home. This is preferably formed in a plurality of sections G1, G2 and G3, hingedly connected together to permit folding to certain predetermined widths. These sections can be of any desired size to provide necessary overall width and length and are identical in construction, each section comprising a plurality of transversely disposed, spaced apart joists 12 formed of any desired suitable material, with laterally projecting, spaced apart lugs or pipe sections 13 secured or formed integral with the web thereof which lugs are hollow to accommodate the threaded end 14 of an eye bolt 15, the eye 16 of which is interlinked with the eye 17 of a companion eye bolt 18 provided on the joists of the adjacent floor section. A nut 19 is interposed between the adjacent ends of the lugs 13 and into which the threaded end 14 of the bolt 15 is threaded, and manipulation of the nut by means of a wrench (not shown) serves to adjust the eye bolts accordingly; wood flooring 20 is laid over these joists 12 and is secured thereto in any desired manner.

A pilot section 21 is provided on certain of the floor joists 12; said pilot section being accommodated in a recess 22 provided in the end of the adjacent joist, so that when the joists are arranged in end to end relation, the pilot 21 fits snugly in the recess 22. When these sections G1, G2 and G3 are arranged in edge to edge relation, a wrench (not shown) is applied to the nuts 19 to draw the ends of the joists into tight interlocking end to end relation, and the edges of the floor sections will thus be drawn into tight abutting facial contact.

The outer side edges of the sections G1 and G3 of the floor are formed rigid with the side walls 23 and 24 of the building and are, of course, provided with windows 25 and doors 25a where necessary.

The front and rear walls 26 and 27 are detachably secured to the various floor sections G1, G2 and G3, and side walls 23 and 24 respectively, in any desired manner, and are hingedly connected to the side walls by means of strap hinges 28 (see FIG. 12 of the drawings) to permit them being swung inwardly to position against the side walls 23 and 24, all as shown in broken lines in FIGURE 4 of the drawings, the arrows indicating the path of travel of the walls. If desired, both the front and rear wall can be hingedly connected to one side wall to swing thereagainst, and it should also be noted that they can be swung against either the inner or outer face of the side walls as desired, depending on the connection of the hinges, the front and rear wall being locked in assembled position by means of suitable lock mechanism 29.

Gable members 30 and 31 form a part of the front and rear walls and are hingedly connected to the top edges thereof at 32, these gables being swung downwardly against the inner face of the walls when the components are folded for transportation.

The manner of forming the ceiling C is generally the same as forming the floor, it is formed in sections C1, C2 and C3, these sections being of substantially the same width and length as are the corresponding floor sections, the sections 20a being much thinner than the flooring.

The roof structure is also formed with a plurality of sections R1, R2 and R3 connected together in much the same manner as is the floor and ceiling (see FIG. 8 of the drawings), the joists R3 being mitered to fit snugly together at their upper ends, with roof boards 33 secured to these joists, and shingles 34 secured to the roof boards in any approved manner, the shingles being so applied that there is an overlap of the row of shingles on the one section which overlaps the one end of the row of shingles on the next lowest section, to thus form a tight leakproof joint which permits the sections to be separated and placed on the folded structure when it is folded to move from factory to location, or from one location to another, all as clearly shown in FIG. 2 of the drawings. Each section R1 has a short section R4 secured thereto which bears on the side walls and projects therebeyond, the ends being cut as at 36 (see FIG. 11 of the drawings) to cradle a conventional eave trough E therein, said eave trough being connected to downspouts (not shown) as usual, and links 35 connect certain of the eyebolts 15 and 18 to facilitate the connection.

Trusses T are interposed between the roof joists and the ceiling and can be secured in position in any desired manner to support snow loads, wind pressure, etc., these trusses being readily removable for bundling, all as shown in FIG. 2 of the drawing.

The sections C1 are hingedly connected to the upper edge of the side walls 23 and 24 and to each other by means of eyebolts 15 and 18 (see FIGURES 6 and 7 of the drawings), the one free edge of section C3 being detachably secured to the opposite side wall 24 by means of bolts 37 or the like. A projecting strip 38 is provided on both the front and rear walls and serves to support the sections at their ends, and when the structure is folded for transportation, these ceiling sections fold to position shown in FIG. 2 of the drawings.

The roof is preferably but not necessarily pitched as shown, and is formed in individual sections similar to the floor and ceiling, and it will be understood that these roof rafters can be formed either of wood or metal as desired.

From the foregoing description, it will be obvious that I have perfected a very simple, practical and economical, foldable home which can be fabricated in the factory and so constructed and connected that it can be compactly folded, for easy transportation from factory to the homesite or from one homesite to another.

What I claim is:

1. In a foldable, portable home of the class described including, a foldable, sectional floor, comprising a plurality of floor sections hingedly interconnected, side walls rigidly secured to the outer edges of the outer side floor sections, end walls hingedly secured to one end of each side wall, gable sections on the upper edges of the end walls and hingedly connected thereto; said end walls and gable sections being swingable inwardly against such side walls, a sectional ceiling, comprising a plurality of ceiling sections flexibly interconnected with the outer edges of the outer side ceiling sections hingedly secured to the upper edges of the side walls, and a sectional, foldable roof structure mounted on said side walls.

2. The combination defined in claim 1 in which the roof structure includes rafters which project beyond the side walls, said rafters being shaped to cradle and mount an eave trough thereon.

3. The combination as defined in claim 1 in which the roof structure includes rafters, each rafter comprising a plurality of hingedly connected sections of predetermined lengths, the lower end section of each rafter being formed with a transversely disposed trough shaped cut-out therein, and an eave trough mounted in said cut-outs.

4. The construction defined in claim 1 in which the floor sections include spaced apart joists, spaced apart laterally projecting, aligned lugs provided on the side wall of the joists, a threaded nut interposed between each pair of lugs, and interlinked eyebolts, having threaded ends extending into said lugs, said eyebolt being adjustable longitudinally therein when the nut is rotated.

5. In a foldable, portable structure of the class described comprising, a foldable sectional floor having a plurality of hingedly interconnected sections, side walls rigidly secured to the one edge of the outer sections of the floor, end walls hingedly connected to one end of each side wall and swingable to folded position thereagainst, said floor sections including a plurality of joists, the joist in one floor section being in substantial alignment with the joists in the adjacent section and being formed with a projecting pilot extension interfitting, when the floor is laid flat, with a recess formed in the end of the joists in the adjacent floor section.

6. The combination defined in claim 5 in which tubular lugs are provided on the side walls of each joist, and interlinked eyebolts mounted in the lugs of the respective joists, and means for drawing said opposed joists into tight interlocking relation.

7. In a foldable, portable house of the class described including a foldable, sectional floor comprising: a plurality of hingedly interconnected floor sections, side walls rigidly secured to the outer side edges of the outer floor sections; end walls hingedly secured to one end of each side wall, and provided with gable sections hingedly secured to the upper edges thereof; each end wall and gable section being swingable, as a unit, inwardly against the inner face of the side wall; a sectional ceiling comprising a plurality of sections hingedly connected to the side walls and to each other; a sectional, foldable roof structure mounted on the side walls, and trusses interposed between said ceiling supports and said roof structure.

References Cited by the Examiner

UNITED STATES PATENTS

| 863,710 | 8/07 | Ganoe | 16—128 |
|---|---|---|---|
| 1,250,415 | 12/17 | Aylwin | 20—2 |
| 1,268,715 | 6/18 | Hoffman. | |
| 1,812,223 | 6/31 | Tatlow. | |
| 2,259,783 | 10/41 | Sparling | 20—2 |
| 2,670,986 | 3/54 | Presnell. | |
| 2,751,635 | 6/56 | Donnahue | 20—2 |
| 2,805,884 | 9/57 | Kinsman | 296—23 |
| 3,012,291 | 12/61 | Rice | 20—2 |

FOREIGN PATENTS 129,363    1948    Australia.

JACOB L. NACKENOFF, *Primary Examiner.*

WILLIAM I. MUSHAKE, *Examiner.*